United States Patent [19]

Bonnerot

[11] 4,051,357

[45] Sept. 27, 1977

[54] DOUBLE ODD DISCRETE FOURIER TRANSFORMER

[75] Inventor: Georges Bonnerot, L'Hay les Roses, France

[73] Assignee: Telecommunications Radioelectriques et Telephoniques T.R.T., Paris, France

[21] Appl. No.: 662,898

[22] Filed: Mar. 1, 1976

[30] Foreign Application Priority Data

Mar. 5, 1975 France .................................. 75.06861

[51] Int. Cl.² ............................................. G06F 15/34
[52] U.S. Cl. .................................................. 364/726
[58] Field of Search ............... 235/156, 152; 324/77 B, 324/77 D

[56] References Cited

U.S. PATENT DOCUMENTS

| | | | |
|---|---|---|---|
| 3,584,781 | 6/1971 | Edson | 235/156 |
| 3,638,004 | 1/1972 | Sloane et al. | 235/156 |
| 3,803,391 | 4/1974 | Vernet | 235/152 |

Primary Examiner—David H. Malzahn
Attorney, Agent, or Firm—Frank R. Trifari; Daniel R. McGlynn

[57] ABSTRACT

An arrangement for computing the discrete Fourier transform intended for converting N samples of a real signal in the time domain to N real Fourier coefficients. This device is implemented with a conventional Fourier transformer of the order N/4, to which an input computer unit and an output computer unit are connected in which a small number of multiplications of complex numbers is performed.

6 Claims, 5 Drawing Figures

DOUBLE ODD DISCRETE FOURIER TRANSFORMER

BACKGROUND OF THE INVENTION

1. Field of application of the invention

The invention relates to an arrangement for computing Fourier coefficients $C_n$ of a real input signal, which input signal corresponds with a time sequence of N time- and amplitude discrete samples $X_k$, which device is provided with a pre-processing device to which N discrete samples $X_k$ are applied through an input circuit which is provided with a storage device having at least two outputs; a first multiplying device for multiplying complex numbers, which is connected to the outputs of said storage device and a complex number generator; a FET computer unit which is connected to said multiplying device.

Such an arrangement is applicable to spectral analyses or to filtering of signals.

2. Description of the prior art

The techniques for computing the discrete Fourier transform of a series of equidistant samples of a signal has already been the subject of many publications. See, for example, reference 1 of section (D) below. The most effective manner for computing the discrete Fourier Transform (DFT) is known as "Fast Fourier Transform", (FFT), that is to say the fast discrete Fourier Transform.

If the time sequence is made up of N samples of a real signal then the numbers of operations to be carried out for an FFT is the same as the number of computations which is performed by the FFT if the time sequence is formed by N complex samples. Because of the properties of real signals the number of operations which is performed in an FFT is excessively high if real signal samples are applied. As is described in reference 2 the number of operations at N real samples can be reduced to a number which is approximately equal to the number of operations which must be performed at N/2 complex samples.

This known arrangement is based on an FFT which is constructed in usual manner and which is exclusively suitable for processing complex signal samples and generating complex Fourier coefficients. By means of the preprocessing device and the first multiplying device the real signal samples are converted to complex numbers which are fed to the FFT.

If, as for signals having given symmetry properties, the Fourier coefficients are real the number of operations to be performed can be reduced still further, namely this number of operations can be reduced to approximately N/4 as compared with the number of operations in a conventional FFT (see ref. 3). To attain this reduction in the number of operations to be performed the conventional structure of the FFT is changed, which is undesirable or even impossible with a FFT computer unit which is intended as a module.

SUMMARY OF THE INVENTION

It is an object of the invention to provide an arrangement of the type indicated in the preamble for converting real samples of a real time signal to the real Fourier coefficients while using a conventional FFT.

In accordance with the invention the storage device is therefore arranged to generate N/4 signal samples $X_i$ and N/4 signal samples $X_{(N/2)+i}$ at its output while the signal samples $X_i$ and $X_{(N/2)+i}$ are shifted relative to one another over N/2 samples; which multiplying device is arranged for generating N/4 complex samples $Z_i$ in accordance with the pair of output samples $X_i$, $X_{(N/2)+i}$ of the storage device and the complex number generated by the complex number generator; said FFT computer unit producing N/4 complex signals $\sigma_q$ in response to the N/4 complex signals $Z_i$; said arrangement further including a second multiplying device and associated second complex number generator means; the said signals $\sigma_q$ being applied to said second multiplying device which in response to the signals $\sigma_q$ and complex numbers applied thereto, produces the real Fourier coefficients $C_q$ and the real Fourier coefficients $C_{(N/2)+q}$ as real and imaginary part respectively of a complex number of $C_q + j\, C_{(N/2)+q}$.

By using the measures according to the invention a FFT of the order N/4 may be applied.

D. REFERENCES

1. Digital Signal Processing; Part 2; L. R. Rabiner. C. M. Radar; IEEE Press 1972.
2. Real Signals Fast Fourier Transform Storage Capacity and Step Number Reduction by Means of an Odd Discrete Fourier Transform; J. L. Vernet; Proceedings of the IEEE, October 1971; pp 1531 - 1532.
3. A Fast Fourier Transform Algorithm for Symetric Real Valued Series; H. Ziegler; IEEE Transactions on Audio and Electroacoustics, Vol. AU-20, No. 5, December 1972; pp 353–356.

The conventional DFT

The conventional DFT is defined as follows:

$$C_k = \frac{1}{N} \sum_{n=0}^{N-1} X_n \cdot \exp\left[-2\pi j \frac{k \cdot n}{N}\right] \quad (1)$$

In this equation $C_k$ denotes the $K^{th}$ Fourier coefficient to be computed, $X_n$ an input signal sample, N the number of input signal samples $X_n$ taken into consideration; $j = \sqrt{-1}$ and $n$ and $k$ denote integers having the value 0, 1, 2, ..., N−1.

In a similar manner the inverse discrete Fourier transform is defined as:

$$X_n = \sum_{k=0}^{N-1} C_k \cdot \exp\left[2\pi j \cdot \frac{k \cdot n}{N}\right] \quad (2)$$

Figure 1:
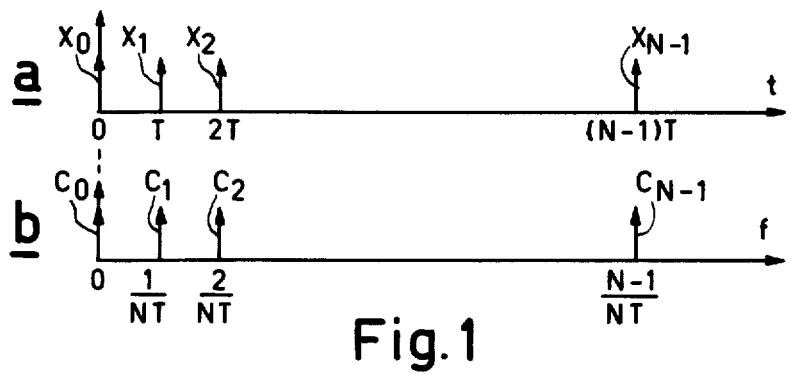
In FIG. 1 some diagrams show the relation between time- and frequency domain samples of a conventional FFT.

The relation defined by the DFT or the inverse DFT between the time domain and the frequency domain is diagrammatically shown in FIG. 1. Diagram 1a shows N signal samples $X_0, X_1, X_2, \ldots, X_{N-1}$. These signal samples occur at the instants $0, T, 2T, \ldots (N-1)T$. With these N signal samples N Fourier coefficients $C_0, C_1, C_2, \ldots C_{N-1}$ can be computed by means of the DFT defined in equation (1). More particularly these coefficients represent samples of the frequency spectrum of the signal which is represented by the signal samples $X_0, \ldots X_{N-1}$. These frequency samples have been taken at the frequencies $0, 1/NT, 2/NT, \ldots (N-1)NT$ (1/NT). These frequency samples are shown in diagram 1b.

Conversely, by means of the inverse DFT defined in equation (2) signal sample $X_0, X_{N-1}$ of diagram 1a can be derived from the frequency samples $C_0, \ldots C_{N-1}$ of diagram 1b.

The computations which must be carried out when effectuating the equation (1) or (2) respectively are of the same type. The description which follows below will therefore be restricted to effectuating the equation (1).

Figure 2:
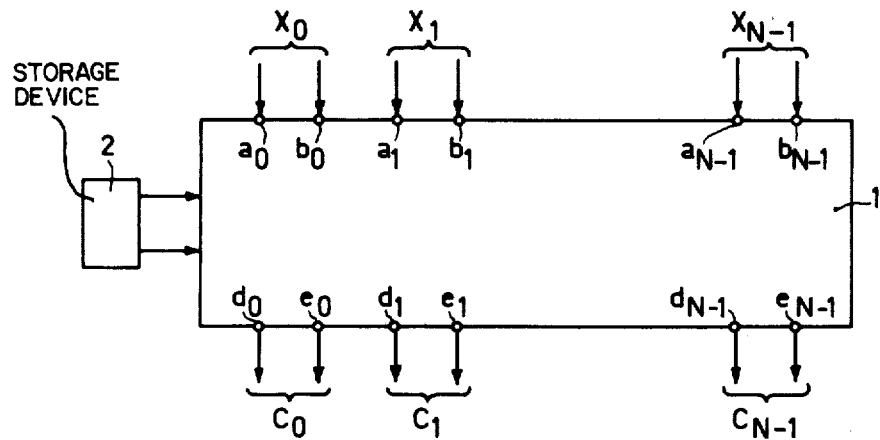
FIG. 2 shows a circuit diagram of a conventional FFT.

The conventional Fourier transformers have been designed for processing complex signal samples and for supplying complex Fourier coefficients. Such a Fourier transformer of the order N may, as shown in FIG. 2 be thought of as a computing unit 1, which is provided with N pairs of inputs $(a_0, b_0), (a_1, b_1), \ldots (a_{N-1})$ to which the complex numbers $X_0, X_1, \ldots X_{N-1}$ are applied and which is provided with N pairs of outputs $(d_0 e_0), (d_1, e_1) \ldots (d_{N-1}, e_{N-1})$ at which the complex number $C_0, C_1, \ldots C_{N-1}$ are produced. Furthermore the complex coefficients $\exp[-2\pi j(kn/N)]$ where $n = 0, 1, 2, \ldots (N-1)$ and $k = 0, 1, 2, \ldots (N-1)$ are applied to the computer unit 1. These complex coefficients are supplied by a storage device 2. Starting from the complex coefficients and from complex input numbers $X_0, X_1, \ldots X_{N-1}$ the unit 1 computes, in accordance with formula (1), the complex numbers $C_0, C_1, \ldots C_{N-1}$, which become available at the above-mentioned pairs of outputs.

With such a conventional DFT many superfluous computations are performed in case the Fourier coefficients of a real time signal must be determined which signal exclusively has real or exclusively imaginary Fourier coefficients.

By means of the arrangement according to the present invention it is possible to reduce in a simple way the storage capacity to one fourth and to reduce, in case N is large, the number of computations to be performed to approximately one fourth.

The double odd discrete Fourier transformer

Figure 3:
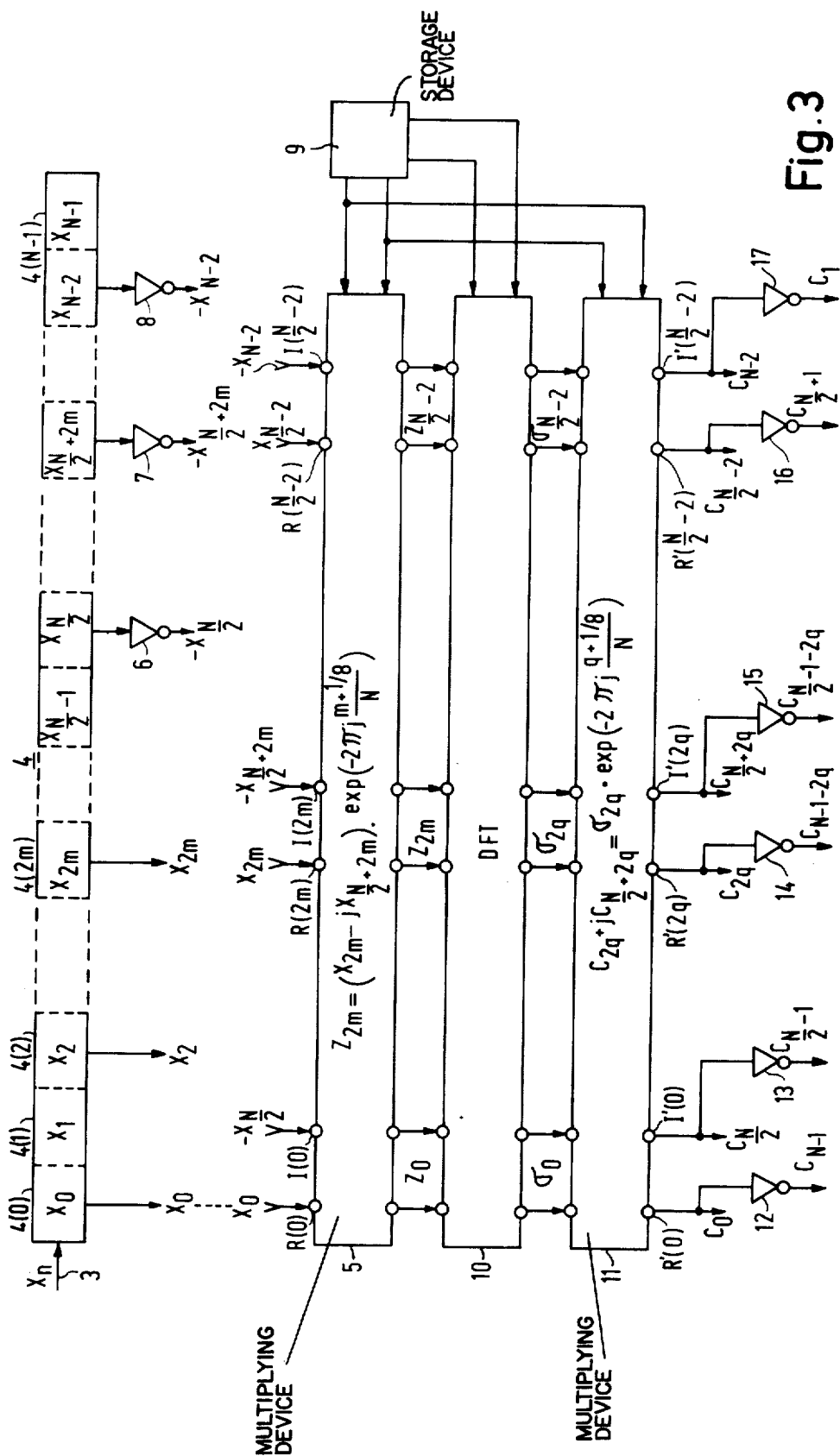
FIG. 3 shows the arrangement according to the invention.
Figure 4:
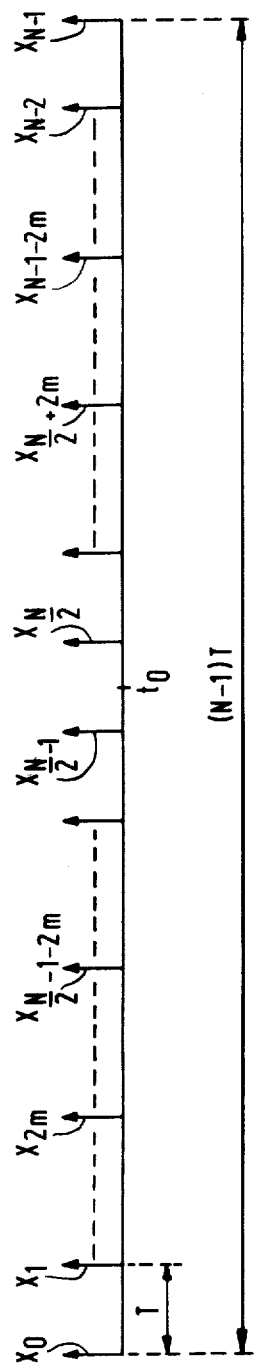
FIG. 4 shows a series of signal samples which are supplied to the arrangement according to the invention.

The arrangement according to the invention is shown in FIG. 3. This arrangement comprises a storage device 4. The signal samples are applied to this storage device 4 through an input 3. This storage device 4 is constructed as a shift register having N register sections labelled $4(0) - 4(N-1)$, each register section being arranged for storing a complete signal sample $X_n$. This device also comprises a first multiplying device 5 which is provided with N/4 inputs $R(0), R(2), R(4), \ldots R((N/2) -2)$ and N/4 inputs $I(0), I(2), I(4), \ldots I((N/2) -2)$. The signal samples stored in the register sections having an even number and which are incorporated in the left hand part of the register 4 are applied to the inputs $R(i)$. The signal samples stored in the register sections having an even number and which belong to the right-hand part of the register 4 are fed to the inputs $I(i)$ of the multiplying device 5 after their polarity has been reversed. In the Figure the above-mentioned polarity reversal is symbolically shown by means of inverters 6, ... 8. The signal sample applied to an input $R(i)$ is now considered as being the real part of a complex number whose imaginary part is given by the signal sample which is applied to the associated input $I(i)$. So the complex number $X_{2m} - j X_{(N/2) + 2m}$, for example is applied to the pair of inputs $R(2m), I(2m)$.

In the multiplying device 5 this complex number $(X_{2m} - j X_{(N/2) + 2m})$ is multiplied by the complex number $\exp[-2\pi j(m+\tfrac{1}{4})/N]$ whose value, for each value of $m$ ($m = 0, 1, 2, \ldots (N/4) - 1$) is derived from a storage device 9. Now this multiplying device supplies N/4 complex numbers $Z_{2m}$ ($m = 0, 1, 2, \ldots (N/4) - 1$). Now these complex numbers are applied to a conventional DFT 10 of the order N/4. This DFT produces N/4 complex numbers $\sigma_{2q}(q = 0, 1, 2, (N/4) - 1)$. To determine these complex numbers $\sigma_{2q}$, coefficients are applied to the DFT 10 which coefficients are also produced by the storage device 9. The N/4 complex numbers $\sigma_{2q}$ are applied to the pairs of inputs of a second multiplying device 11, which is identical to the first multiplying device 5. The complex numbers $\sigma_{2q}$ are again multiplied by a complex number $\exp[-2\pi j(q+\tfrac{1}{4})/N]$ whose value at each value of $q$ ($q = 0, 1, 2, \ldots (N/4) - 1$) is derived from the storage device 9. The N/4 products formed in this way are available as N/4 complex numbers $(C_{2q} + j C_{(N/2) + 2q})$ at the complex pair of outputs $R'(0), I'(0), \ldots R'((N/2) - 2), I'((N/2 - 2)$ of the multiplying device 11. The desired N real samples in the frequency domain are now obtained in the following way: at the N/4 real outputs $R'(2q)$ ($g = 0, 1, 2, \ldots (N/4) - 1$) the N/4 samples $C_{2q}$ are available. By reversing the sign of these samples $C_{2q}$, by means of the circuits 12, 14, 16, the N/4 samples $C_{n-1-2q}$ are obtained. The N/4 samples $C_{N/2 + 2q}$ are present at the N/4 imaginary outputs $I'(2q)$. By reversing the sign of these samples $C_{(N/2)+2q}$, by means of the circuits 13, 15, 17 the N/4 samples $C_{(N/2)-1-2q}$ are obtained.

Mathematical basis

The arrangement according to the invention is based on a new discrete Fourier transform. This new transform will be referred to as double odd discrete Fourier transform. This transform is characterized by the equation:

$$C_k = \frac{1}{N} \sum_{n=0}^{N-1} X_n \cdot \exp\left[-2\pi j \frac{(2k+1)(2n+1)}{4N}\right] \quad (3)$$

This equation, wherein $n$ and $k$ are integers, $n$ and $k$ each having the values $0, 1, 2, 3, \ldots N-1$ assigns, just as the Fourier transform defined in equation (1), N Fourier coefficients $C_k$ to N samples $X_n$ of a signal, where $X_n$ and $C_k$ are, in the general case, complex members.

If T is the interval between the samples $X_n$ of the time signal, the exponential function in the double odd DFT of equation (3) may be written as follows:

$$\exp\left[-2\pi j \cdot \frac{(2k+1)}{2NT} (2n+1)\frac{T}{2}\right]$$

From this it follows that the values of the exponential function must be taken at the instants $(2n + 1)(T/2)$, which are odd multiples of T/2 and at the frequency ($2k+1/2NT$, which are odd multiples of the frequency $1/2NT$.

Figure 5:
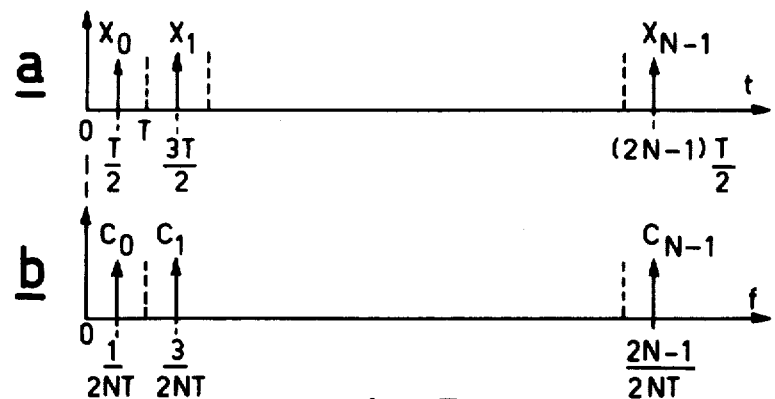
In FIG. 5 some diagrams show the relation between time- and frequency domain samples for the arrangement according to the invention.

From this it appears that the double odd DFT (3) starting from samples $X_n$ of a time signal which have been taken at instants $(2n + 1)(1/2)$, that is to say at odd multiples of $T/2$ produces Fourier coefficients $C_k$ which are situated at odd multiples of the frequency $1/2NT$. This is shown diagrammatically in FIG. 5. More particularly, the diagram 5a shows the signal samples $X_0, X_1, \ldots X_{N-1}$ which occur at the instants $T/2, 3(T/2), \ldots (2N-1)(T/2)$. Diagram 5b shows the Fourier coefficients $C_0, C_1, \ldots C_{N-1}$ which are obtained by the double odd DFT and which occur at the frequencies $1/2NT, 3/2NT, \ldots (2N-1)/2NT$.

Besides a double odd discrete Fourier transform also a double odd inverse Fourier transform can be defined, namely as follows:

$$X_n = \sum_{n=0}^{N-1} C_k \cdot \exp\left[2\pi j \cdot \frac{(2k+1)\cdot(2n+1)}{4N}\right] \qquad (4)$$

By using the properties of the exponential functions it can be proved that the double odd DFT has the following properties:

If the samples $X_n$ of the signal are real the complex Fourier coefficients are such that:

$$C_k = -\overline{C_{N-1-k}} \qquad (5)$$

where $\overline{C_{N-1-k}}$ represents the complex conjugated value of $C_{N-1-k}$.

If the Fourier coefficients $C_k$ are real then the complex signal samples are such that:

$$X_n = -\overline{X_{N-1-n}} \qquad (6)$$

From the two properties (5) and (6) it follows that if both the samples $X_n$ and the Fourier coefficients $C_k$ are real that:

$$X_n = -X_{N-1-n} \qquad (7)$$

$$C_k = -C_{N-1-k} \qquad (8)$$

By means of the preceding equations it will now be proved that in the arrangement according to the invention of FIG. 3 a double odd Fourier transform is performed.

From equation (8) it follows that only the coefficients having even or odd numbers need be computed because the coefficients having odd or even numbers respectively can be derived therefrom. If, in particular, the coefficients having even numbers are computed then, if $k$ can be assumed to be equal to $2q$ (where $q = 0, 1, 2, \ldots (N/2) - 1$) and equation (3) passes into:

$$C_{2q} = \frac{1}{N} \sum_{n=0}^{N-1} X_n \cdot \exp -2\pi j \cdot \frac{(4q+1)\cdot(2n+1)}{4N} \qquad (9)$$

The series of N samples $X_n$ (where $0 \leq n \leq N-1$) can be split up into a series having N/2 samples $X_n$ (where $0 \leq n \leq (N/2)-1$) and a series having N/2 samples $X_{(N/2)+n}$ (where $0 \leq n \leq (N/2)-1$). By using the known properties of the exponential function, equation (9) changes into $$C_{2q} = \frac{1}{N} \sum_{n=0}^{\frac{N}{2}-1} (X_n - jX_{\frac{N}{2}+n}) \exp\left[-2\pi j \cdot \frac{(4q+1)\cdot(2n+1)}{4N}\right] \qquad (10)$$

If now the series of samples $X_n$ and $X_{(N/2)+n}$ are considered to be composed of samples with even position $X_{2m}$ and $X_{(N/2)+2m}$ and samples having odd position $X_{2m+1}$ and $X_{(N/2)+2m+1}$, where $m = 0, 1, 2, 3, \ldots (N/4) - 1$ equation (10) may be written as follows:

$$C_{2q} = \frac{1}{N} \sum_{m=0}^{\frac{N}{4}-1} (X_{2m} - jX_{\frac{N}{2}+2m}) \cdot \exp\left[-2\pi j \frac{(4q+1)(4m+1)}{4N}\right] + \frac{1}{N} \sum_{m=0}^{\frac{N}{4}-1} (X_{2m+1} - jX_{\frac{N}{2}+2m+1}) \cdot \exp\left[-2\pi j \frac{(4q+1)(4m+3)}{4N}\right] \qquad (11)$$

Equation (11) now defines N/2 Fourier coefficients $C_{2q}$, where $q = 0, 1, 2, ((N/2) - 1)$. These N/2 Fourier coefficients can be split into N/4 Fourier coefficients $C_{2q}$ where $q = 0, 1, 2, \ldots (N/4) - 1$ and N/4 Fourier coefficients $C_{(N/2)+2q}$ where $q = 0, 1, 2, \ldots (N/4) - 1$. By applying equation (11) for computing the coefficients $C_{2q}$ and $C_{(N/2)+2q}$ (where $0 \leq q \leq (N/4) - 1$) and by using the known properties of the exponential functions it can be proved that N/4 complex numbers $C_{2q} + jC_{(N/2)+2q}$ can be obtained which satisfy:

$$C_{2q} + jC_{\frac{N}{2}+2q} = \frac{2}{N} \sum_{m=0}^{\frac{N}{4}-1} (X_{2m} - jX_{\frac{N}{2}+2m}) \cdot \exp\left[-2\pi j \frac{(4q+1)(4m+1)}{4N}\right] \qquad (12)$$

This equation can be further reduced to:

$$\left\{ \begin{array}{l} C_{2q} + j \cdot C_{\frac{N}{2} + 2q} = \frac{2}{N} \cdot \exp\left[-2\pi j \frac{q+\frac{1}{2}}{N}\right] \times \\ \sum_{m=0}^{\frac{N}{4}-1} \left[(X_{2m} - jX_{\frac{N}{2} + 2m}) \cdot \exp(-2\pi j \frac{m+\frac{1}{2}}{N})\right] \exp\left[-2\pi j \frac{ms}{\frac{N}{4}}\right] \end{array} \right. \quad (13)$$

If now the input signal satisfies equation (7) then all Fourier coefficients are real and so the real and the imaginary part of equation (12) or (13) each represent a Fourier coefficient. The N/4 complex output numbers of the multiplying device 11 of FIG. 3 are consequently equivalent to N/2 real Fourier coefficients. The remaining N/2 Fourier coefficients are now computed by means of equation (8).

The foregoing only describes the case in which real time signal samples are converted to real frequency signal samples, namely by applying equation (3). By starting from equation (4) it can be proved that the device according to FIG. 3 is also suitable for converting real frequency signal samples into real time signal samples.

From all the foregoing it appears that the number N must be a multiple of 4, which, of course, is no restriction as regards the number of samples to be converted. If N/4 is a power of 2 the known algorithms of the DFT will preferably be used to realize the device 10.

What is claimed is:

1. An arrangement for computing Fourier coefficients $C_n$ of a real input signal corresponding to a time sequence of N time-and amplitude discrete samples $X_k$, comprising an input for supplying N discrete samples $X_k$;
   a preprocessing device connected to said input, and comprising a storage device having two outputs for producing N/4 signal samples $X_i$, and N/4 signal samples $X_{(N/2) + i}$ respectively, said signal samples $X_i$ and $X_{(N/2) + i}$ being shifted in relation to one another by N/2 samples;
   a first multiplying device connected to said outputs of said storage device and comprising a complex number generator for multiplying signals from said preprocessing device by predetermined complex numbers, and producing an output signal N/4 complex samples $Z_i$ in response to the pairs of output samples $X_i$, $X_{(N/2) + i}$ of the storage device and the complex numbers generated by the complex number generator;
   a DFT computer having an input connected to said output of said multiplying device and having an output for producing N/4 complex signals $\sigma_q$ in response to the N/4 complex samples $Z_i$ on said input; and
   a second multiplying device and associated second complex number generator means connected to said output of said DFT computer for producing the real Fourier coefficients $C_q$ and the real Fourier coefficients $C_{(N/2) + q}$ as real and imaginary part respectively of a complex number $C_q + jC_{(N/2) + q}$, in response to said signals $\sigma_q$ and the complex numbers generated by said second complex numbers generating means.

2. An arrangement as claimed in claim 1, comprising means for applying said signal samples $X_i$ and $X_{(N/2) + i}$ produced by said storage device as complex numbers $X_i - jX_{(N/2) + i}$ to the first multiplying device so that these complex numbers $(X_{2m} - jX_{(N/2) + 2m})$ are multiplied by complex coefficients which are the values of an exponential function whose exponent is equal to: $-2\pi j(i+\frac{1}{2})$, N where $i$ is an integer, with $i = 0, 1, 2, \ldots (N/4) - 1$.

3. An arrangement as claimed in claim 1, characterized in that the complex numbers $\sigma_q$ applied to second multiplying device are multiplied therein by complex coefficients which are each the value of an exponential function whose exponent is equal to: $-2\pi j(q+\frac{1}{2})/N$, where $q$ is an integer which varies between 0 and $N/4 - 1$.

4. An arrangement for computing real signal samples $X_k$ of a real signal from the real Fourier coefficients $C_n$ of the signal comprising an input for supplying N Fourier coefficients;
   a preprocessing device connected to said input for processing said N Fourier coefficients, comprising a storage device having two outputs for producing N/4 coefficients $C_i$ and N/4 coefficients $C_{(N/2) + i}$ respectively, said coefficients $C_i$ and $C_{(N/2) + i}$ being shifted in relation to one another by N/2 coefficients;
   a first multiplying device connected to said outputs of said storage device, and comprising a complex number generator for multiplying signals from said preprocessing device by predetermined complex numbers, and producing an output signal N/4 complex samples $\sigma_i$ in response to the pairs of output samples $C_i$, $C_{(N/2) + i}$ of the storage device and the complex numbers generated by the complex number generator;
   a DFT computer having an input connected to said output of said multiplying device and having an output for producing N/4 complex signals $Z_i$ in response to the N/4 complex samples $\sigma_i$ on said input; and
   a second multiplying device and associated second complex number generator means connected to said output of said DFT computer for producing the real Fourier coefficients $X_i$ and the real Fourier coefficients $X_{(N/2) + i}$ as real and imaginary part respectively of a complex number $X_i + jX_{(N/2) + i}$ in response to said signals $Z_i$ and the complex numbers generated by said second complex number generating means.

5. An arrangement as claimed in claim 4, comprising means for applying said coefficients $C_i$ and $C_{(N/2) + i}$ produced by the storage device as complex numbers $C_i - jC_{(N/2) + i}$ to the first multiplying device, so that these complex numbers $C_i - jC_{(N/2) + i}$ are multiplied by complex coefficients which coefficients which are the values of an exponential function whose exponent is equal to: $+2\pi j(i+\frac{1}{2})/N$ where $i$ is an integer, $i = 0, 1, 2, \ldots N/4 - 1$.

6. An arrangement as claimed in claim 4, characterized in that the complex numbers $Z_i$ which are applied to the second multiplying device are multiplied therein by complex coefficients which are the values of an exponential function whose exponent is equal to: $2\pi j(i+\frac{1}{2})/N$ where $i$ is an integer with $i = 0, 1, 2, \ldots (N/4) - 1$.

* * * * *